United States Patent [19]

Vaughan

[11] Patent Number: 4,636,288
[45] Date of Patent: Jan. 13, 1987

[54] ELECTRODIALYTIC CONVERSION OF MULTIVALENT METAL SALTS

[76] Inventor: Daniel J. Vaughan, 36 Paxon Dr., Wilmington, Del. 19803

[21] Appl. No.: 665,052

[22] Filed: Oct. 26, 1984

Related U.S. Application Data

[63] Continuation-in-part of Ser. No. 568,897, Jan. 6, 1984, abandoned.

[51] Int. Cl.$^4$ .............................................. B01D 13/02
[52] U.S. Cl. .............................. 204/182.4; 204/182.5; 204/151
[58] Field of Search ...................... 204/180 P, 151, 98, 204/, DIG. 13, 182.4, 182.5, 182.3, 301; 210/748

[56] References Cited

U.S. PATENT DOCUMENTS

| | | | |
|---|---|---|---|
| 3,394,068 | 7/1968 | Calmon et al. | 204/182.4 |
| 4,080,270 | 3/1978 | O'Leary et al. | 204/180 P |
| 4,111,780 | 9/1978 | Murayama et al. | 204/180 P |
| 4,204,921 | 3/1980 | Britton et al. | 204/98 |
| 4,253,929 | 3/1981 | Keritsis | 204/180 P |
| 4,325,792 | 4/1982 | Vaughan | 204/151 |
| 4,439,293 | 3/1984 | Vaughan | 204/180 P |

FOREIGN PATENT DOCUMENTS

2046793 11/1980 United Kingdom .

Primary Examiner—John F. Niebling
Assistant Examiner—B. J. Boggs, Jr.
Attorney, Agent, or Firm—Charles J. Tonkin

[57] ABSTRACT

Salts of multivalent cations in aqueous solution, with or without admixture with salts of monovalent cations, are converted into the respective acids or halogens of the anions of the salts and into water insoluble salts or ionically immobile compounds of the multivalent cations. The conversion is effected by electrodialysis and electrotransport of the multivalent cations through a cation permeable membrane into aqueous solutions containing both agents that insolubilize or ionically immobilize the multivalent cations and a soluble salt of an acid, which acid in a one normal solution would have a pH no greater than three and forms water soluble salt with the multivalent cation. The use of the added salt in the solution into which the multivalent cations are electrotransported minimizes fouling of the membrane and makes the electrodialytic conversion efficient and with high capacity.

24 Claims, No Drawings

ELECTRODIALYTIC CONVERSION OF MULTIVALENT METAL SALTS

This application is a continuation-in-part of U.S. Ser. No. 568,897, filed Jan. 6, 1984, now abandoned.

FIELD OF THE INVENTION

This invention relates to the electrodialytic conversion of salts in aqueous solutions into the respective acids and halogens of the anions, the hydroxides of monovalent cations, and substantially water insoluble salts of multivalent cations. Specifically, the invention relates to the electrotransport of multivalent cations through cation permeable membranes into aqueous solutions containing agents that insolubilize or ionically immobilize the multivalent cations. The invention comprises the use of a soluble salt of an acid, which acid in a one normal solution would have a pH no greater than three and forms a water soluble salt with a multivalent cation, in the aqueous solution containing agents that insolubilize multivalent cations. The soluble salt of an acid prevents fouling of the cation permeable membrane with water insoluble salts of multivalent cations. The insolubilization of the multivalent cations prevents electrodeposition of metals in the membrane and on the cathode of the electrochemical cell that require frequent cell maintenance. The result is an efficient, high capacity electrodialytic process for conversion, preferably continuous, of salts of multivalent cations into the acids and halogens of the anions and substantially water insoluble salts of, or other ionically immobile compounds with, multivalent cations.

One embodiment of the process of this invention relates to an electrodialytic process comprising an electrodialytic cell having an anolyte compartment and a catholyte compartment separated by a cation permeable membrane. The anolyte compartment contains an anode and an aqueous solution, preferably acidic, comprising a soluble salt of a multivalent cation. The catholyte compartment contains a cathode and an aqueous solution of a soluble salt of an acid which acid in a one normal solution would have a pH no greater than three and forms a water soluble salt of a multivalent cation and agents that insolubilize multivalent cations. The multivalent cations are insolubilized with hydroxyl and other anions that form substantially water insoluble salts. This electrodialytic process is especially applicable for the conversion of multivalent cation salts of chromic and other acids used for anodizing aluminum, chromating cadmium, zinc and copper platings, etching metals and printed circuits and plating of metals and plastics. The anions of the multivalent salts are converted to the free acids which permits repeated use of the acids. The multivalent cations are transported through the cation permeable membrane and are converted to hydroxides and other water insoluble salts that can be recovered for use. This embodiment is described in my copending U.S. application, Ser. No. 568,897, filed Jan. 6, 1984, now abandoned which is incorporated by reference.

Another embodiment of the process of this invention relates to an electrodialytic process comprising an electrodialytic cell having at least three compartments that are separated by cation permeable membranes. The cell has an anolyte compartment containing an anode and an aqueous solution comprising salts of mono and multivalent cations; a reactor compartment containing an aqueous solution of a soluble salt of an acid which acid in a one normal solution would have a pH no greater than three and forms a water soluble salt with a multivalent cation and agents that ionically immobilize multivalent cations; and a catholyte compartment containing a cathode and an aqueous solution of monovalent cation hydroxide. The multivalent cations in the reactor compartment are ionically immobilized by insolubilization, or formation of chelates and complex compounds with negative or no electrical charge. This embodiment is especially useful for the electrolysis of sodium chloride brine containing salts of calcium and other multivalent cations to produce chlorine and high purity caustic soda with retention of high cell capacity.

Another variation of this multivalent cation salt conversion invention relates to an in-cell electrodialytic process for restoration of cation permeable membranes that are fouled with salts of multivalent cations. The process comprises the use of an aqueous solution of a soluble salt of an acid which acid in a one normal solution would have a pH no greater than three and forms a water soluble salt with a multivalent cation, e.g., sodium chloride, on the cathode side of the fouled membrane and an acidic aqueous solution, preferably having a pH of not more than three, on the anode side of the membrane, and the electrotransport of the multivalent cations from the membrane into the aqueous solution containing the soluble salt of an acid. This in-cell process for restoration of cation permeable membranes is especially useful for restoration of fouled cation permeable membrane in chlor-alkali cells where the catholyte system is unsuitable for acids.

BACKGROUND OF THE INVENTION

Electrodialysis is a well known art (see U.S. Pat. Nos. 4,325,792; 3,481,851; 3,909,381; 4,006,067; 3,983,016; 3,788,959; 3,926,759; 4,049,519; 4,057,483; 4,111,772; 4,025,405; 4,358,545; 3,793,163; 4,253,929; 4,325,798 and 4,439,293, the disclosures of which are incorporated by reference). Electrodialysis is the transport of ions through ion permeable membranes as a result of an electrical driving force. The process is commonly carried out in an electrochemical cell having a catholyte compartment containing a cathode and a catholyte and an anolyte compartment containing an anode and an anolyte, the catholyte and anolyte compartments being separated by ion permeable membranes. There is always in every electrodialysis process some small degree of reverse migration of cations through the anion permeable membrane and/or anions through the cation permeable membrane. Prior processes do not provide a satisfactory solution to the problem of reverse migration of hydroxyl ions through cation permeable membranes when the aqueous feed of the electrolysis cell contains multivalent metal cations. The hydroxyl ions reverse migrating react with multivalent cations being transported through the membrane to form substantially water insoluble salts in and on the cation permeable membranes. These salts reduce cell capacity at a constant voltage.

Acids are used broadly in the chemical, electronics, mining, electroplating and metal finishing industries wherein the acids react with metals and other salts to form salts of multivalent cations and anions of the respective acids. Prior processes do not provide a satisfactory method for regenerating and purifying acidic solutions containing multivalent cations and recovery of the multivalent metal cations as a substantially water insoluble salt. When electrolysis of aqueous solutions of salts of multivalent cations is carried out with a catholyte comprising hydroxyl ions to precipitate the multivalent cations that are transported through a cation permeable membrane, the hydroxyl ions tend to reverse migrate through the membrane and tend to form hydroxide precipitates of multivalent of multivalent cations in and on the membrane which foul the membranes. Considerably better results are obtained by the use of aqueous solutions of inorganic carbonate or bicarbonate as disclosed in my U.S. Pat. Nos. 4,325,792 and 4,439,293. When acidic catholytes are used in the electrodialysis of aqueous solutions of salts of multivalent cations, the cations are transported from an acidic solution through a cation permeable membrane into an acidic solution. The multivalent cations tend to electro deposit as metals in the membrane and on the cathode which require frequent maintenance of the cell. An object of this invention is to provide a high capacity electrodialytic process which can be used for continuous conversion of salts of multivalent cations into the acids and halogens of the anions of the salts and the hydroxides and other substantially water insoluble salts of the multivalent cations.

In the past decade, the chlor-alkali industry has focused its attention on developing membrane cells to produce low salt or salt-free caustic. Membranes have been developed for this purpose which are hydraulically impermeable but which will permit sodium ions to be transported from a brine anolyte while substantially preventing transport of chloride ions. Such cells are operated by flowing a brine solution into the anolyte compartment of an electrolysis cell and by providing salt-free water to the catholyte compartment to serve as the caustic medium, the anolyte compartment being separated from the catholyte compartment by a cation permeable membrane.

Membranes are now available that permit the manufacture of about 30 wt. % caustic soda, that is essentially free of salt, at a current efficiency of 90%. All of these membranes, however, are affected by impurities entering the cell with the incoming salt feed. An "ultra-pure" brine feed to the anolyte compartment of the cell is necessary for satisfactory performance (D. J. Gasser and R. J. Horvath paper presented at The Chlorine Insitute's 27th Chlorine Plant Operations Seminar, Washington, D.C., February 1984). Multivalent cations in the brine result in higher cell voltage and lower current efficiencies. In addition calcium and magnesium impurities are known to have a harmful effect on the useful life of membranes (Charles J. Molnar and Martin M. Dorio. Effects of brine quality on chlor-alkali membrane cell performance, 152nd National Meeting The Electrochemical Society, Atlanta, Ga., October 1977).

To meet performance and economic goals with membrane chlor-alkali processes, the industry has developed methods for purification of the brine. Gasser and Horvath in the above mentioned publication report that acceptable membrane cell performance can only be achieved with brine containing less than 50 ppb total hardness. By using ion-exchange in series with conventional primary treatments they report that an "ultra-pure" brine can be achieved.

In a closed loop membrane cell brine system, saturated brine flows through a primary treatment and secondary ion-exchange treatment, then to the membrane cells. Depleted brine, about 15 wt. % sodium chloride, from the cell is transferred to a dechlorination system where available and free chlorine are removed from the brine. Further chemical treatment using sodium sulfite is required to decompose residual chlorine, which if allowed to remain in solution would destroy the calcium adsorption capacity of the ion exchange resin. The sulfite treated brine is then saturated with salt and returned to the brine purification step. The addition of sulfite to the brine results in the formation of sulfate ions which are detrimental to cell performance.

The requirement for "ultra-pure" brine is a significant capital investment and operating cost for membrane processes. The brine purification system must be operated without upset to prevent damage to the membranes by multivalent cation salts. The dechlorination and chlorine decomposition steps must be operated without upset to prevent damage to the ion-exchange resins.

SUMMARY OF THE INVENTION

The invention provides a high capacity electrodialytic process which can be used for the continuous conversion of salts of multivalent cations into the acids and halogens of anions and water insoluble salts of the multivalent cations by the use of a soluble salt of an acid which acid in a one normal solution would have a pH no greater than three and forms a water soluble salt of a multivalent cation in an aqueous solution containing ions or agents that insolubilize or ionically immobilize multivalent cations. The conversion comprises the electrotransport of multivalent cations from an aqueous anolyte, preferably acidic, comprising said soluble salts of multivalent cations through a cation permeable membrane into an aqueous solution comprising the soluble salt and ions, e.g., hydroxyl and other agents that insolubilize the multivalent cations. The anions of the multivalent cation salt in the anolyte are converted to their respective acids or halogens in the anolyte. The use of a soluble salt of an acid in the catholyte or solution receiving the electrotransported multivalent metal cation prevents fouling of the membrane with water insoluble salts of multivalent cations. The insolubilization of the multivalent metal cations essentially eliminates the electrodeposition of metals on the cathode and in or on the membrane of the electrolysis cell. The result is a high capacity electrodialytic process which can be used for the continuous conversion of salts of multivalent cations. The acids formed in the anolyte can be used repeatedly for etching metals, electroplating, anodizing and other uses. The substantially water insoluble salts of the multivalent cations can be recovered as solids from the aqueous solution for use or disposal.

Another aspect of the electrodialytic conversion of salts of multivalent cations is the production of chlorine and substantially salt-free caustic by the electrolysis of sodium chloride brine containing calcium, magnesium, iron, and other multivalent metal cations by the use of a soluble salt of an acid, e.g., sodium chloride, which acid in a one normal solution would have a pH no greater than three and forms a water soluble salt of a multivalent cation and agents that ionically immobilize multivalent cations in a reactor compartment of an electrolysis cell that is separated from an anolyte and a catholyte compartment by cation permeable membranes. The multivalent and sodium cations are electrotransported from the anolyte brine through a cation permeable membrane into a reactor compartment solution. Therein, the multivalent cations in the reactor compartment are ionically immobilized as water insoluble salts and chelates or complex compounds with a negative or no electrical charge. The sodium ions are electrotransported from the reactor compartment solution through a cation permeable membrane into an aqueous catholyte of sodium hydroxide. Chlorine is formed in the anolyte. Mixtures of salts of mono and multivalent cations can be electrolyzed in this electrodialytic process with separation of the monovalent and multivalent cations and selective separation of the multivalent cations. This process does not require ultrapure brine to operate efficiently without fouling cation permeable membranes with water insoluble salts of multivalent cations which increase cell voltage and decrease electrolysis efficiency. This process does not require dechlorination or sulfite treatment of the recycle brine to effect removal of multivalent cations by ion exchange. The process of this invention is an efficient method for electrolysis of brines and other alkali metal salts containing calcium, magnesium, iron, copper and other multivalent cations.

Cation permeable membranes that are fouled with water insoluble salts of multivalent cations can be restored in-cell electrodialytically by the use of an aqueous solution of a soluble salt of an acid, e.g., sodium chloride, which acid in a one normal solution would have a pH no greater than three and forms at least a water soluble salt of a multivalent cation on the cathode side of said fouled membrane and the use of an acidic solution on the anode side of said fouled membrane and the electrotransport of the multivalent cations from the fouled membrane into the aqueous solution comprising the soluble salt of an acid. This process is especially useful for restoration of fouled cation permeable membranes in chlor-alkali cells that have catholyte systems unsuitable for use of strong acids to clean membranes.

DETAILED DESCRIPTION OF THE INVENTION

For cations to be electrotransported through a cation permeable membrane, they must be soluble (ionically mobile) in a solution, enter the membrane at the interface of the solution and membrane, be ionically mobile through the polymeric membrane structure, and exit the membrane into an aqueous solution. All of these requirements are easily met for electrodialysis of salts of monovalent cations. The monovalent cations form water soluble salts and water soluble hydroxides which do not foul a cation permeable membrane. In contrast, multivalent cations form substantially water insoluble salts with hydroxyl ions and many other anions, and tend to be not ionically mobile through the membrane into an aqueous solution comprising anions that form substantially water insoluble salts with the multivalent cations. If precipitates are formed in and on the membrane to a high degree, ion transport is substantially precluded and rupture of the membrane can occur. In general, multivalent metal cations form hydroxide precipitates in the pH range of about 3 and higher.

In electrodialysis, cations are attracted to the negatively charged cathode and anions are attracted to the positively charged anode. Since there are no cation permeable membranes 100% impermeable to anions there is always some reverse migration of anions from the catholyte through the cation permeable membrane. This, in turn, provides a potential for multivalent cations to react with hydroxyl and other anions to form water insoluble salts in the membrane. The presence of only 1 to 3 parts per million of calcium ion in sodium chloride brine is sufficient to result in fouling membranes with calcium salts in the production of chlorine and caustic. The electrical current flow in the cell decreases at a constant applied voltage or the cell voltage increases at a constant current density as the membrane is fouled. The higher the concentration of hydroxyl ions in the catholyte the higher the potential is for forming multivalent cation salts in the membrane and loss in cell capacity and efficiency.

It has now been found that high cell capacity can be achieved and retained by the use of a soluble salt of an acid, which acid in a one normal solution has a pH no greater than three and forms a water soluble salt with a multivalent cation, in a catholyte comprising ions or agents that insolubilize multivalent cations while causing the electrodialytic conversion of salts of multivalent cations into the acid or halogen of the anion and the hydroxide or other substantially water insoluble salts of the multivalent cations. The use of a soluble salt of an acid in a reactor compartment of a three or more compartmented electrodialytic cell provides a method for electrolysis of mixtures of salts of mono and multivalent cations with ionic immobilization of the multivalent cations while converting the anions of the salts to acids or halogens and the monovalent cations to substantially pure hydroxides. The soluble salt of an acid is surprisingly effective in preventing membrane fouling and loss in cell capacity while electrotransporting high concentrations of multivalent cations through cation permeable membranes into an aqueous solution containing hydroxyl ions. The soluble salt of an acid is effective at low concentrations, e.g., down to about 200 ppm, in aqueous solutions of sodium carbonate or sodium bicarbonate in preventing loss in cell capacity. The effectiveness of the soluble salt of an acid increases with the strength of the acid and the solubility of the salt of a multivalent cation and the acid of the soluble salt. The effectiveness of the soluble salt at low concentrations indicates that the anions of the salt might be concentrated at the interface of the membrane and the aqueous solution comprising the soluble salt of an acid. This could result in a thin film of anions of the soluble salt that serve as an ionically mobile junction for the multivalent cations to exit the membrane into the aqueous solution where they are insolubilized. The soluble salt of an acid does not significantly effect the insolubilization of the multivalent cations in the aqueous solution or catholyte. While the foregoing theory is offered as a possible explanation of why the soluble salt of an acid effects the electrotransport of multivalent cations, it is not intended to limit the process by this theory.

Any soluble salt of an acid, which acid in a one normal solution would have a pH no greater than three and forms a water soluble salt of a multivalent cation can be used in the electrodialytic process of this invention. The salt formed with the multivalent metal cation need only be slightly water soluble, i.e., sufficient to minimize formation of insoluble multivalent metal salts on the membrane; a solubility of at least 2000 ppm is preferred. The preferred soluble salts of acids are alkali salts of acids of sulfur, halogen, nitrogen, phosphorus and carbon, which acids in a 0.1 normal solution would have a pH of less than three and more preferably of two or less and form water soluble salts with multivalent cations, preferably with the multivalent cations present in the feed or anolyte of the electrodialysis cell. Mixtures of soluble salts of acids of different cations and anions can be used to effect retention of cell capacity when processing mixtures of salts of multivalent cations. Preferably, a soluble salt of an acid, which acid forms water soluble salts with all multivalent cations in the anolyte, is used in processing mixtures of salts of multivalent cations. These and similar variations will be apparent to one skilled in the art.

The concentration of the soluble salt of an acid in an aqueous solution or catholyte can be varied over a wide range, from a saturated solution to about 200 ppm. It is preferable to use a high concentration of the soluble salt of an acid to operate at high cell capacity (high current density) at low cell voltage. If the anion of the soluble salt of an acid reverse migrates from the aqueous solution or catholyte and adversely effects the quality of the anolyte, it is preferable to use a low concentration of the soluble salt of an acid and adjust electrical conductivity with sodium carbonate or bicarbonate. As will be apparent to one skilled in the art, the concentration of the soluble salt of an acid must be sufficient to minimize the membrane fouling tendency of the ions or agents in the aqueous solution or catholyte that insolubilize multivalent cations.

The electrodialytic cells of this invention can have two or more compartments. A two compartment cell has anolyte and catholyte compartments separated by a cation permeable membrane. The anolyte compartment has an anode and an aqueous anolyte comprising a soluble salt of a multivalent cation or a mixture of salts of mono and multivalent cations and anions. The catholyte compartment has a cathode and an aqueous catholyte comprising a soluble salt of an acid, which acid in a one normal solution would have a pH no greater than three and forms a water soluble salt of a multivalent cation, and agents which insolubilize multivalent cations. A three compartment cell has an anolyte compartment, a reactor compartment and a catholyte compartment separated by cation permeable membranes. The anolyte compartment has an anode and an aqueous solution comprising a salt of a multivalent cation, the reactor compartment has an aqueous solution comprising soluble salt of an acid and agents to ionically immobilize the multivalent cations. The catholyte compartment has a cathode and an aqueous solution comprising a soluble hydroxide, carbonate or bicarbonate or an aqueous acidic solution or an aqueous solution comprising a soluble salt of an acid, which acid in a one normal solution would have a pH no greater than three, and agents to insolubilize multivalent cations. A three compartment cell can have an anolyte compartment, a feed compartment and a catholyte compartment separated by cation permeable membranes. The anolyte can be an aqueous acidic solution with or without soluble salts, and the feed is an aqueous solution comprising a soluble salt of a multivalent cation and the catholyte is an aqeuous solution of a soluble salt of an acid and agents to insolubilize multivalent cations. Cells of this invention that have more than three compartments can be separated by all cation permeable membranes or combinations of cation, anion and neutral ion permeable membranes and porous separators, provided that the membrane between the anolyte and the next compartment is selectively cationic. It will be apparent to one skilled in the art, that the soluble salt of an acid, which acid in a one normal solution has a pH no greater than three is used to facilitate the electrotransport of multivalent cations through cation permeable membranes into aqeuous solutions comprising agents that insolubilize multivalent cations and that the soluble salt of an acid should be used in those compartments wherein this condition exists. It will also be apparent to those skilled in the art that the compartments between the feed or anolyte compartment comprising a salt of a multivalent cation and the catholyte compartment must be in electrical communication with the cathode and the compartments must be separated by separators that are permeable to cations. Further it will be apparent that the membrane should be selected to be resistant to chemical attack by the reactants and conversion products. Thus, where the feed contains a sodium chloride brine and the electrolysis generates chlorine in the anolyte the membrane in contact therewith should be resistant to deleterious attack by the chlorine.

The reactor compartment of a three or more compartmented electrodialytic cell of this invention has an aqueous solution of a soluble salt of an acid, which acid in a one normal solution would have a pH no greater than three and forms a water soluble salt with a multivalent cation and agents to ionically immobilize multivalent cations selectively The multivalent cations are ionically immobilized as water insoluble salts, chelates and complex compounds with a negative or no electrical charge. The concentration of the soluble salt of an acid and the agents to ionically immobilize the multivalent cations can be varied. In general, it is desirable to use a low concentration of agents that insolubilize the multivalent cations to minimize the membrane fouling tendency of these agents. It is desirable to use a high concentration of the soluble salt of an acid to obtain high cell capacity at low cell voltage. There are a large number of agents that can be used to ionically immobilize the multivalent cations, such as, soluble hydroxides, carbonates, bicarbonates, acids and soluble salts of oxalic, hydrofluoric, phosphoric acids, hydrogen sulfide, alkali sulfide, thiosulfates, polymeric acids, and ion exchange resins. There are a large number of compounds that can be used to form chelates and complex compounds of multivalent cations that have a negative (anion) or no electrical charge (see Inorganic Chemistry, Fritz Ephraim by P. C. L. Thorne and E. R. Roberts, Fifth Edition, Gurney and Jackson - London, England, pp. 289–332). Chelates and complex compounds that ionically immobilize the multivalent cations can be formed with agents, such as, aminoacetic acid, ethylene diaminotetraacetic acid, alpha hydroxy acids, dimethylglyoxime, nitroso phenylhydroxylamine, acetylacetone, 8 hydroxyquinoline and alkali cyanides. The ionic immobilization of the multivalent cations can be carried out in the cell or in equipment outside the cell. The multivalent cations can be selectively insolubilized, chelated and complexed to effect separation by electrotransport, extraction, filtration, electrodeposition, ion exchange and other chemical and mechanical methods. For example, one or more multivalent cations can be selectively immobilized in the reactor compartment and other multivalent cations electrotransported into a third or catholyte compartment for insolubilizing therein in order to effect a separation of different multivalent cations. It will be apparent to those skilled in the art, that the reactor compartment is used to ionically immobilize the multivalent cations to permit separation of the multivalent and monovalent cations and that more than one in-cell reactor compartment or external reactors can be used.

The anolyte of a two compartment electrodialytic cell of this invention is an aqueous solution comprising a soluble salt of a multivalent cation or a mixture of salts of mono and multivalent cations. This solution is acidic, i.e., has a pH no greater than seven, preferably no greater than three. The concentration of salts of multivalent cations can vary from a few parts per million to saturated solutions. The anolyte may also contain additions to complex ions, solubilize salts and precipitate impurities, wetting agents, detergents and other additives used in the finishing of metals and plastics. If the anolyte is not the feed to the electrodialytic cell, the anolyte can be an acidic solution with or without soluble salts. The feed to the cell would be an aqueous solution comprising a soluble salt of a multivalent cation as hereinabove described for the anolyte.

The feed to the multi-compartmented electrodialytic cell is normally circulated through the feed compartment and the acids generated in the anolyte effluent are recovered. Likewise the catholyte can be circulated through the catholyte compartment and the precipitated or ionically immobilized multivalent cation compounds recovered from the effluent such as by settling, filtration, ion-exchange or other convenient means. Similarly the liquid in the reactor compartment of a three or more compartmented cell can be circulated and the effluent treated to recover the multivalent cation materials. As will be apparent to one skilled in the art, flow rates will be selected to allow sufficient time for electrolysis consistent with recovery of reaction products.

Any cation permeable membrane can be used to separate the compartments of the electrodialytic cells of this invention. These cation permeable membranes have fixed negative charges distributed in the polymer matrix and are permeable to positively charged ions. The membranes are preferably membranes of hydrocarbon and halocarbon polymers containing acids and acid derivatives. Particularly suitable acid polymers are perhalocarbon polymers containing pendant sulfonic, sulfonamide and carboxylic acid groups. The membranes may be a multi-layered structure of different polymers and contain fillers, reinforcements and chemical modifiers. The preferred membranes are substantially chemically stable to the process conditions and mechanically suitable for design and economical operation of the electrodialytic process. The preferred membranes for strong oxidizing media are the perfluorocarbon membranes, such as, Nafio ®, manufactured by Dupont, that contain sulfonic, carboxylic or sulfonamide groups. The preferred membranes for the electrolysis of sodium chloride brine in an electrodialytic cell of this invention having a reactor compartment are perfluorocarbon membranes of high electrical conductivity and high electrotransport of multivalent cations for separating the anolyte brine from the reactor compartment and a hydrocarbon or perfluorocarbon membrane of high perm selectivity (high electrolysis efficiency) for separating the reactor compartment from the catholyte compartment.

This invention is for the electrodialytic processing of multivalent cations and mixtures of mono and multivalent cation salts in aqeuous solutions and uses a soluble salt of an acid which acid on a one normal solution would have a pH no greater than three, in the catholyte or an aqueous solution in electrical communication with the cathode of an electrodialytic cell. Aqeuous solutions of salts of multivalent cations and mixtures of salts of multi and monovalent cations are found throughout the chemical, electronics, mining, metal finishing and other industries. These aqeuous solutions comprise essentially all multivalent cations. In some solutions the desirable component is the multivalent cation; in other feed solutions the multivalent cation is an impurity and the purified acid is the desired component. In the chlor-alkali process the multivalent cation is an impurity that fouls the membrane where a continuous high process capacity is desired. In other aspects, it is desirable to separate and isolate multivalent cations from mixtures of salts of multivalent cations. Another aspect is the separation of mono and multivalent cations to produce pure monovalent cation hydroxides from mixtures of salts of mono and multivalent cations. Also it is desirable to restore membranes fouled with salts of multivalent cations. These and other aspects of the instant invention will be apparent to those skilled in the art.

One embodiment of the process of this invention is the electrolysis of brine containing multivalent cations, (more generally the electrodialytic conversion of mixtures of mono and multivalent cation salts) to produce chlorine and substantially pure sodium hydroxide. This embodiment comprises the use of a soluble salt of an acid (sodium chloride) and agents to ionically immobilize multivalent cations in a reactor compartment of a three compartment electrolysis cell. The soluble salt minimizes membrane fouling; the ionic immobilization of the multivalent cations permits the selective electrotransport of sodium ions from the reactor compartment to the cathode compartment. To illustrate the practice of this aspect of the instant invention an electrodialytic cell was assembled having an anolyte compartment containing an anode, a reactor compartment and a catholyte compartment containing a cathode. The compartments were separated by cation permeable membranes. The cell had an electrolysis area of nine square inches and was equipped for continuously adding anolyte to the anolyte compartment, reactor solution to the reactor compartment and catholyte (e.g., water) to the catholyte compartment. The anode was a ruthenium-based anode for chlor-alkali cells obtained from the Electrode Corporation and the cathode was a stainless steel mesh. The cation permeable membranes were Nafion ® membrane 417 separating the anolyte and reactor compartment and Nafion ® 324 membrane separating the catholyte and reactor compartments. The membranes were obtained from the Dupont Company. The total anode to cathode gap was 0.3 inches, the cell temperature 80°–85° C., the current density 2 amperes per square inch. Cell voltage was the total anode to cathode voltage. Chlorine was formed at the anode. Caustic efficiency was measured by the caustic soda produced per unit of direct current electricity. The d.c. power supply was made by Hewlett Packard and equipped to run at constant current and variable voltage. The brine used for a control "pure brine" was 23 wt. % sodium chloride (saturated solution) with less than 0.5 ppm of calcium ion and having a pH of 3 or less. Reagent grade chloride salts of calcium, magnesium, copper, iron and other multivalent cations were added to the "pure brine" to obtain the desired composition of the anolyte. The reactor solution was filtered and circulated through the reactor compartment, and remained at about the initial composition throughout the experiment with the exception that reverse migration of hydroxyl ions from the catholyte compartment increased the pH of the solution. When desired, the pH was adjusted and maintained by the addition of the acid of the soluble salt. Each experimental example comprises a series of experiments wherein the catholyte composition remained essentially constant (adjusted by the addition of water) and the composition of the anolyte and reactor compartments varied as described below. Each experiment was run for about four days. An increase in cell voltage during an experiment indicates some fouling of the membrane and loss of cell capacity.

EXAMPLE 1

In a three compartment system, "pure brine" was added to the anolyte compartment and to the reactor compartment and the concentration of sodium hydroxide in the catholyte compartment was adjusted to 20 wt. %. The initial cell voltage was 4.2 volts. After four days of operation the cell voltage had increased to 4.4 volts. The reactor solution had a pH of 10.5 and contained a small quantity of white precipitate (which analyzed as calcium hydroxide). The current efficiency was 91%. Then the catholyte solution was changed to 10 wt. % sodium chloride and about 2 wt. % sodium hydroxide. The reactor solution was changed to a 22 wt. % sodium chloride and 2 wt. % oxalic acid. The initial cell voltage was 4.5 and after two hours of operation the voltage decreased to 4.2 volts. The catholyte solution was changed to a 20 wt. % sodium hydroxide and the operation continued. The initial cell voltage was 4.1 volts. After four days the cell voltage was 4.0 volts and current efficiency was 92%. A white precipitate was formed in the reactor solution that analyzed as a mixture of calcium oxalate and calcium hydroxide. The pH of the reactor solution was 10 after four days of electrolysis. Then, calcium chloride was added to the brine to obtain a brine feed of 5000 ppm of calcium ion. Cell operation was continued for three days with the pH of the reactor solution maintained at a pH of about 5. Cell voltage remained constant at 4.0–4.1 volts. Current efficiency was 91%.

EXAMPLE 2

The assembled electrolytic cell of Example 1 was used. The anolyte was "pure brine" with 1% calcium chloride, the catholyte was 20 wt. % sodium hydroxide, and the reactor solution contained 22 wt. % sodium chloride. The initial cell voltage was 4.3. The reactor solution was filtered through a cartridge of ion exchange resin to remove solids and then through a column of Amberlite IRC 718 ion exchange resin to remove calcium. The pH of the reactor solution was 9.5 to 10 throughout the run. The cell voltage remained constant at 4.2 volts and 92% current efficiency for four days. The filter cartridge contained a white precipitate that analyzed as calcium oxide hydrate. Calcium was removed from the Amberlite IRC 718 resin by regeneration with hydrochloric acid. The operation was continued and the reactor solution changed to a 22 wt. % sodium chloride, a 1 wt. % sodium fluoride, 1 wt. % oxalic acid and 1 wt. % sodium meta silicate. The pH of the reactor solution was adjusted with hydrochloric acid to 4 and maintained for three days. The cell voltage remained constant at 4.2 and the current efficiency was 91%. Operation was continued and the reactor solution changed to a 22 wt. % sodium chloride, 2 wt. % sodium meta phosphate and 1 wt. % of sodium hypophospite. The pH was adjusted to 11 and maintained at about 11 for three days. The cartridge filter contained a gelatinous precipitate that contained calcium phosphate and calcium hydroxide. The initial cell voltage was 4.2 and after three days the cell voltage was 4.3 volts. Operation was continued and the reactor solution changed to a 22 wt. % sodium chloride and the pH of the reactor solution adjusted to three and maintained at about three. The initial cell voltage was 4.3. After one hour of operation cell voltage had increased to 4.8 and after two hours to 9.5. The catholyte solution was diluted to a 2 wt. % sodium hydroxide and sodium sulfate was added to obtain a solution containing about 2 wt. % sodium hydroxide and 4 wt. % sodium sulfate. Cell voltage began to decrease immediately after adding the sodium sulfate and after thirty minutes cell voltage 1 was 4.5 volts. The catholyte contained a white precipitate. Operation was continued and the reactor compartment solution was changed to a 22 wt. % sodium chloride solution and the solution was circulated through a filter and Amberlite IRC 718 resin. The pH of the solution was adjusted to 10 and maintained there. The catholyte was changed to a 20 wt. % sodium hydroxide. The initial cell voltage was 4.2 and after 3 days had decreased to 4.1. The current efficiency was 92%. The run was terminated. This shows the restoration of the fouled Nafion ® 324 membrane separating the reactor and catholyte compartments.

EXAMPLE 3

The assembled electrolytic cell of Example 1 was used. The anolyte was "pure brine" with 1 wt. % calcium chloride, the catholyte was 20 wt. % sodium hydroxide and the reactor solution was a 22 wt. % sodium chloride. The initial cell voltage was 4.2. Cupric chloride and ferrous chloride were added to the brine to obtain a brine feed to the anolyte compartment of 1 wt. % cupric chloride, 1 wt. % ferrous chloride and 24 wt. % sodium chloride. The pH of the brine was 2.5. The reactor solution was adjusted to a pH of 10 and contained 3 wt. % sodium sulfide. The initial cell voltage was 4.2 and remained constant for four days. The reactor solution contained brown-black precipitates that were collected on the filter and analyzed to contain copper, iron, sulfur and oxygen indicating a mixture of salts. The catholyte was water white with no precipitates. The current efficiency was 91%. The operation was continued and the reactor solution changed to a 22 wt. % sodium chloride and 0.5 wt. % nitrosophenylhydroxylamine. The initial cell voltage was 4.2 and remained essentially 4.2 for three days. Precipitates were formed in the reactor compartment and collected on the cartridge filter. The catholyte was water white with no precipitates. The operation was terminated.

EXAMPLE 4

The assembled electrochemical cell of Example 1 was used. The anolyte was a 25 wt. % "pure brine" containing 1 wt. % calcium chloride. The reactor compartment contained a 10 wt. % sodium hydroxide and the catholyte compartment contained a 20 wt. % sodium hydroxide. The initial cell voltage was 4.3. Cell voltage began to increase rapidly and after 20 minutes was 11.5 volts. The reactor solution was changed to a 22 wt. % sodium chloride and 3 wt. % oxalic acid, the pH was adjusted and maintained at 8.5. The initial cell voltage was 11.2 and the voltage began to decline rapidly. After one hour the cell voltage was 4.2 and after two days, 4.1. The current efficiency was 92%. This illustrates the effect of calcium ion in the brine on cell voltage and membrane fouling. It also shows the restoration of the membrane separating the anolyte and reactor compartment.

These examples show the ease and efficiency of producing chlorine and caustic soda by electrolysis of sodium chloride brine containing multivalent cations. The ionic immobilization of the multivalent cations permits separation of mono and multivalent cations and, in turn, the production of high purity hydroxides of the monovalent cations. The soluble salt of an acid prevents fouling of the separating membranes and restoration of fouled membranes.

To illustrate another embodiment of the process of this invention the assembled cell of Example 1 was used with the exception that the ruthenium based anode was replaced with an Ebonex, reduced titanium oxide anode obtained from IMI in England. The anolyte compartment contained an aqueous acidic solution comprising sulfuric acid. The composition of the aqueous solution in the reactor compartment (now feed compartment) was varied as described below and the aqueous solution in the catholyte oomprises a soluble salt of an acid. No attempts were made to determine electrolysis efficiency. Each electrolysis was carried out for about one day. The anolyte composition was adjusted by the addition of water. The catholyte compositions changed with electrolysis; the multivalent cations were insolubilized and the monovalent cations formed soluble hydroxides. A decrease in cell voltage indicates an increase in the conductivity of the catholyte or feed composition. The aqueous solution (feed) was fed to the cell at a constant rate with one pass through the anolyte compartment, an increase in cell voltage indicates fouling of the cation permeable membranes.

EXAMPLE 5

The assembled cell of Example 1 modified as above was used. The anolyte was an aqueous solution of 4.7 wt. % sulfuric acid, the catholyte was an aqueous solution comprising 5 wt. % sodium sulfate, and hydroxyl ions formed at the cathode; the feed was an aqueous solution comprising 3 wt. % chromic acid, 2 wt. % nitric acid, 2 wt. % sodium acetate and 5 wt. % dissolved cadmium metal. The initial cell voltage was 6.2 at 0.2 amperes per square inch. The cell voltage remained essentially constant for twenty-four hours at 6.2 to 6.0. The catholyte contained a white precipitate that analyzed as cadmium hydroxide. The feed was changed to an aqueous solution comprising 5 wt. % chromic acid, 3 wt. % cupric chloride, 5 wt. % cupric chromate, and 2 wt. % boric acid. The initial cell voltage was 6.8 at 0.3 amperes per square inch and remained constant at 6.8 volts for 28 hours of electrolysis. The catholyte contained a precipitate of cupric hydroxide. No detectable chlorine was generated at the anode. The runs were terminated and the membrane removed from the cell and examined for deposits. The membrane was essentially free of any metal or salt deposits. The cathode was clean and free of deposits.

Example 5 illustrates that the ease of converting salts of multivalent cations and anions, such as chromate, chloride, borate, acetate and nitrate to the respective acids of the anions and the substantially water insoluble hydroxide of the multivalent cation at a continuous high cell capacity. The soluble salt of an acid (sodium sulfate) facilitates electrotransport of the multivalent cations and prevents fouling of the membranes. The insolubilization of the multivalent cations with hydroxyl ions generated at the cathode permits the long term use of the catholyte and the recovery of the multivalent cation hydroxides as solids for use.

Another embodiment of the process of this invention is the restoration of membrane fouled with salts of multivalent cations. To illustrate the practice of this aspect of the invention a two compartment electrodialytic cell was assembled by removing the reactor compartment of the cell of Example 1. The anolyte and catholyte compartments were separated by cation permeable membranes, i.e., Nafion ® perfluorinated membranes 901 and 203. The 901 membrane comprises sulfonic and carboxylic acid groups and the 204 membrane contains sulfonic and sulfonamide acid groups. Both membranes are high caustic efficiency membranes for chlor-alkali electrolysis. The anolyte was an aqueous solution comprising 20 wt. % sodium chloride and 5 wt. % calcium chloride having a pH of 2. Two catholytes were used: catholyte (1) comprising 20 wt. % sodium chloride and 2 wt. % sodium hydroxide for electrolysis and restoration of the fouled membranes and catholyte (2) comprising an aqueous solution of 20 wt. % caustic for fouling the membranes. The electrolysis conditions were those of Example 1. The cell was operated with catholyte (1) for two hours before taking the initial voltage and about twenty-four hours before taking the final. Catholyte (1) was replaced with catholyte (2) and the cell voltage observed until the voltage reached about 10 volts. Catholyte (2) was then replaced with catholyte (1). The cell was operated for about twenty-four hours and the voltage recorded. The results of several fouling and restoration cycles were very similar. The results were: (a) Membrane 901, initial voltage 4.0, 30 minutes of catholyte (2) 11.5, 28 hours with catholyte (1) 3.9 volts, and (b) Membrane 204, initial voltage 3.9, 60 minutes of catholyte (2) 12.8 volts, 24 hours with catholyte (1) 3.9 volts. These results show the effectiveness of a soluble salt of an acid (e.g., sodium chloride) in restoration of fouled membranes and the electrotransport of multivalent cations through cation permeable membranes into an aqueous solution comprising hydroxyl ions. Similar experiments were made with other combinations of anolytes, aqueous feeds, multi and monovalent cation salts, catholytes, anodes, cathodes, membranes and agents to insolubilize, chelate and complex multivalent cations to effect ionic immobility. The results of these experiments show that the use of a soluble salt of an acid in aqueous solutions containing agents that insolubilize multivalent cations and being in electrical communication with the cathode, prevents fouling of the cation permeable membrane and provides continuous high capacity electrotransport of multivalent cations through cation permeable membranes.

I claim:

1. A process for the electrodialytic conversion of salts or multivalent metal cations in an aqueous solution as an anolyte into the acid of the salt anion or a halogen if the salt anion is a halide, said aqueous anolyte solution being selected from solutions of said salts and solutions of said salts and salts of monovalent cations, which comprises electrotransporting at least multivalent metal cations from said aqueous anolyte solution through a cation permeable membrane into another aqueous solution containing (a) a soluble salt of an acid which acid in a one normal solution would have a pH no greater than three and forms a water soluble salt of said multivalent metal cation and (b) an agent capable of reacting selectively with said multivalent metal cations to form ionically immobile substances selected from precipitates, complexes and chelates of said multivalent metal cations.

2. The process of claim 1 wherein said soluble salt of an acid in the aqueous solution is selected from alkali metal salts of acids of sulfur, halogen, nitrogen, phosphorus and carbon, the acids of which in a 0.1 N solution having a pH of no more than two.

3. The process of claim 1 wherein said other aqueous solution comprises soluble hydroxyl, carbonate or bicarbonate ions or mixtures thereof which react with said multivalent metal cations to form precipitates.

4. A process using an electrodialysis cell for the electrodialytic conversion of salts of multivalent metal cations in a first aqueous solution as an anolyte into the acid of the salt anion or halogen if the salt anion is a halide which comprising passing an electric current through said electrodialysis cell and electrotransporting metal cations including said multivalent metal cations from said first aqueous solution containing said salts in a first compartment of said electrodialytic cell through a cation permeable membrane into a second compartment containing a second aqueous solution of (a) a soluble salt of an acid which acid in a one normal solution has a pH no greater than three and forms a water soluble salt with said multivalent metal cations and (b) an immobilizing agent capable of reacting selectively with said multivalent metal cations to form ionically immobile compounds selected from precipitates, complexes and chelates of said multivalent metal cations, said aqueous solution in said second compartment being in electrical communication with the cathode of said electrodialysis cell.

5. The process of claim 4 wherein said soluble salt of an acid is selected from alkali metal salts of acids of sulfur, halogen, nitrogen, phosphorus and carbon the acids of which in a 0.1 N solution have a pH no more than two and form water soluble salts with said multivalent metal cations.

6. The process of claim 4 wherein said immobilizing agent is selected from alkali cyanides, dimethygloxime, ethylenediaminotetracetic acid, nitrosopheynlhydroxylamine, hydroxyl, carbonate, bicarbonate, oxalate, silicate, fluoride, phosphate, sulfide, thiosulfate ions and ion exchange materials and mixtures thereof.

7. The process of claim 4 wherein said second aqueous solution contains two or more multivalent metal cations and agents to selectively ionically immobilize at least one multivalent metal cation whereby at least one multivalent metal cation is ionically immobilized and at least one other multivalent metal cation is not immobilized but is electrotransported from said second aqueous solution through a cation permeable membrane into a third compartment containing an aqueous solution of (a) a soluble salt of an acid which acid in a one normal solution has a pH no greater than three and forms a water soluble salt with said multivalent cations and (b) an agent capable of reacting selectively with said transported multivalent cations to form ionically immobile compounds selected from precipitates, complexes and chelates of said multivalent cations, said third aqueous solution in said third compartment being in electrical communication with the cathode of said electrodialysis cell.

8. The process of claim 4 wherein said first aqueous solution contains salts of monovalent metal cations in addition to salts of multivalent metal cations, and said monovalent metal cations in said second compartment are transported through a cation permeable membrane into a third compartment containing an aqueous solution having a pH greater than 7 and a cathode for said electrodialysis cell.

9. A process using an electrodialysis cell for the electrodialytic conversion of mixtures of salts of multivalent cations and monovalent cations in a first aqueous solution as an anolyte into the acids or halogens of said anions of said salts which comprises passing an electric current through said electrodialysis cell and electrotransporting said mono and multivalent cations from said first aqueous solution through a cation permeable into a second aqueous solution containing (a) a soluble salt of an acid which acid in a one normal solution would have a pH no greater than three and forms a slightly water soluble salt with said multivalent cations and (b) an immobilizing agent capable of selectively reacting with said multivalent cations to effect ionic immobilization of said multivalent cations through a cation permeable membrane and electrotransporting said monovalent metal cations from said second aqueous solution through another cation permeable membrane into a third aqueous solution comprising hydroxyl ions in electrical communication with a cathode, whereby the electrodialytic separation of mono and multivalent cations in aqueous solutions can be carried out efficiently at a high cell capacity.

10. The process of claim 9 wherein said soluble salt of an acid in said second aqueous solution is selected from alkali metal salts of acids of sulfur, halogen, nitrogen, phosphorus and carbon, the acids of which in a 0.1 N solution having a pH no more than two and form water soluble salts with said multivalent cations.

11. The process of claim 9 wherein said immobilizing agent in said second aqueous solution is selected from substances capable of selectively reacting with said multivalent cations to form chelates or complex compounds with no electrical charge or a negative charge.

12. The process of claim 11 wherein said agent capable of forming a chelate or complex compound with the multivalent cation present is alkali cyanide, dimethylgloxime, ethylenediaminotetraacetic acid, or nitrosophenylhydroxylamine.

13. The process of claim 9 wherein said immobilizing agent in said second aqueous solution is selected from substances capable of reacting with said multivalent cation to form precipitates or water insoluble salts.

14. The process of claim 13 wherein said agent capable of forming a precipitate or water insoluble compound with said multivalent cations that ionically immobilize said multivalent cation is selected from soluble hydroxyl, carbonate, bicarbonate, oxalate, fluoride, silicate, phosphate, sulfide, thiosulfate ions, polymeric acids and ion exchange materials and mixtures thereof.

15. A process for the electrolysis of salts of alkali metal halides containing multivalent metal cations in an aqueous anolyte solution which comprises passing an electric current through an electrolysis cell having at least an anolyte compartment containing an anode and said anolyte solution separated by a cation permeable membrane from a reactor compartment containing (a) a soluble salt of an acid which acid in a one normal solution would have a pH no greater than three and forms a water soluble salt with said multivalent metal cations and (b) an agent capable of reacting selectively with said multivalent metal cations to form ionically immobile compounds selected from precipitates, water insoluble salts, complexes and chelates of said multivalent metal cations in said reactor compartment which is separated by a cation permeable membrane from a catholyte compartment containing a cathode and aqueous catholyte whereby the mono and multivalent cations are electrotransported from said aqueous anolyte through a cation permeable membrane into said reactor compartment and said multivalent cations are ionically immobilized and said monovalent cations are electrotransported from said reactor compartment through a cation permeable membrane into a catholyte compartment containing an aqueous solution comprising hydroxyl ions and the halide anions of the mono and multivalent cation salts are converted to halogen in the anolyte compartment.

16. The process of claim 15 wherein the alkali halide in the aqueous anolyte is sodium chloride.

17. The process of claim 15 wherein the soluble salt of an acid in the reactor compartment is sodium chloride.

18. The process of claim 15 wherein the catholyte is an aqueous solution of sodium hydroxide.

19. The process of claim 15 wherein the multivalent metal cations are insolubilized and removed from the aqueous solution in said reactor comparment by filtration or ion exchange.

20. An electrodialytic process for conversion and removal of salts of multivalent metal cations from a cation permeable membrane in an electrodialytic cell comprising passing an electric current through said electrodialytic cell having (a) an aqueous solution comprising agents to insolubilize or ionically immobilize multivalent metal cations and a soluble salt of an acid which acid in a one normal solution would have a pH no greater than three and forms a water soluble salt of said multivalent metal cation contacting the cathode side of said membrane and (b) an acidic aqueous solution contacting the anode side of said membrane, whereby said multivalent metal cations are electrotransported from said membrane into said aqueous solution comprising said agents to insolubilize or ionically immobilize multivalent metal cations.

21. The process of claim 20 wherein said soluble salt of an acid is selected from alkali metal salts of acids of sulfur, halogen, nitrogen, phosphorus and carbon, the acids of which in a 0.1 N solution having a pH of no more than two and form water soluble salts with said multivalent metal cations.

22. The process of claim 20 wherein the acid in said acidic aqueous solution is selected from acids of sulfur, halogen, nitrogen, phosphorus and carbon or mixtures thereof, the acids of which in a 0.1 N solution have a pH of no more than two.

23. A process for the electrodialytic conversion of salts of multivalent metal cations in an acidic aqueous solution into the acid of the anion or a halogen if the anion is a halide and the hydroxide, carbonate or bicarbonate of said multivalent metal cation which comprises electrotransporting said multivalent metal cation from said aqueous solution through a cation permeable membrane into an aqueous solution comprising soluble hydroxyl, carbonate or bicarbonate ions or mixtures thereof and a soluble salt of an acid, said acid in a one normal solution having a pH no greater than three, whereby the electrodialytic conversion of salts of multivalent metal cations in aqueous solutions can be carried out efficiently at a high cell capacity.

24. In an electrodialysis process of passing an electric current through an electrodialysis cell having at least a cathode compartment and anode compartment, a compartment which can be the anode compartment but not the cathode compartment and which contains an acidic aqueous solution comprising soluble salt of multivalent metal cation, another compartment which can be the cathode compartment but not the anode compartment and which contains an aqueous solution of hydroxyl, carbonate, bicarbonate ions or mixtures thereof, and a cation permeable membrane separating said compartments, the improvement which comprises incorporating in said solution of hydroxyl, carbonate, bicarbonate ions or mixtures thereof a soluble salt of an anion, the acid of which anion in one normal solution has a pH not greater than three, whereby the capacity and efficiency of said electrodialysis cell is increased.

* * * * *